United States Patent
Fujimoto

(10) Patent No.: US 7,359,818 B2
(45) Date of Patent: Apr. 15, 2008

(54) SENSOR APPARATUS, CONTROL SYSTEM HAVING THE SAME AND OFFSET CORRECTION METHOD

(75) Inventor: Naoki Fujimoto, Anjo (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 11/785,412

(22) Filed: Apr. 17, 2007

(65) Prior Publication Data
US 2007/0282553 A1    Dec. 6, 2007

(30) Foreign Application Priority Data
Apr. 18, 2006    (JP) .............................. 2006-114532

(51) Int. Cl.
*G01C 25/00*    (2006.01)
*G01D 18/00*    (2006.01)

(52) U.S. Cl. ...................................... 702/104
(58) Field of Classification Search ................. 702/104
See application file for complete search history.

(56) References Cited

U.S. PATENT DOCUMENTS

| | | | |
|---|---|---|---|
| 5,479,096 A | * | 12/1995 | Szczyrbak et al. .......... 324/132 |
| 5,495,414 A | * | 2/1996 | Spangler et al. ............... 701/45 |
| 6,513,383 B1 | * | 2/2003 | Okano et al. ............. 73/514.34 |
| 6,959,240 B2 | * | 10/2005 | Okamoto ....................... 701/70 |
| 2005/0131602 A1 | * | 6/2005 | Souda .......................... 701/34 |

FOREIGN PATENT DOCUMENTS

| | | |
|---|---|---|
| EP | 590-576 | 1/1996 |
| JP | A-9-318384 | 12/1997 |
| JP | A-2005-257304 | 9/2005 |
| JP | A-2005-291935 | 10/2005 |

* cited by examiner

*Primary Examiner*—Michael P. Nghiem
*Assistant Examiner*—Cindy D. Khuu
(74) *Attorney, Agent, or Firm*—Posz Law Group, PLC

(57) ABSTRACT

Each acceleration sensor of an air bag system includes a sensing device, a communication device and an adjusting device. The sensing device generates a measurement signal, which indicates a measurement value of acceleration. The communication device performs two-way communication relative to a master ECU and each remaining one of the acceleration sensors of the air bag system. The adjusting device adjusts the measurement value based on a physical quantity application state of its own acceleration sensor and a physical quantity application state of each remaining one of the acceleration sensors.

7 Claims, 4 Drawing Sheets

FIG. 6

| | ACCELERATION APPLICATION STATE DETERMINATION RESULT | | | OVERALL DETERMINATION | | OFFSET ADJUSTMENT REQUIRED/NON-REQUIRED STATE | | |
|---|---|---|---|---|---|---|---|---|
| | SENSOR A | SENSOR B | SENSOR C | | | SENSOR A | SENSOR B | SENSOR C |
| CASE-A | 0 | 0 | 0 | ALL ARE "0" | ACCELERATION APPLIED STATE | 0 | 0 | 0 |
| CASE-B | 0 | 0 | 1 | ONLY ONE IS "1" | ACCELERATION APPLIED STATE | 0 | 0 | 0 |
| CASE-C | 0 | 1 | 1 | ONLY ONE IS "0" | ACCELERATION=0 | 1 | 1 | 1 |
| CASE-D | 1 | 1 | 1 | ALL ARE "1" | ACCELERATION=0 | 1 | 1 | 1 |

ACCELERATION=0: "1"
OTHERS : "0"

ADJUSTMENT REQUIRED: "1"
OTHERS : "0"

SENSOR APPARATUS, CONTROL SYSTEM HAVING THE SAME AND OFFSET CORRECTION METHOD

This application is based on and incorporates herein by reference Japanese Patent Application No. 2006-114532 filed on Apr. 18, 2006.

BACKGROUND OF THE INVENTION

1. Field of the Invention

The present invention relates to a sensor apparatus, a control system having the sensor apparatus and an offset correction method of the sensor apparatus.

2. Description of Related Art

A method for diagnosing an acceleration sensor used for deploying an air bag installed in a vehicle is recited in, for example, Japanese Unexamined Patent Publication No. 2005-257304. Specifically, Japanese Unexamined Patent Publication No. 2005-257304 recites an air bag system, which includes acceleration sensing units and a control unit. Each acceleration sensing unit includes an acceleration sensing arrangement for sensing a collision of the vehicle. The control unit performs failure diagnosis of the acceleration sensing arrangement and a deployment operation of an air bag.

In the acceleration sensing unit, the acceleration sensing arrangement includes an acceleration sensor, a diagnosing device and a communication device. The acceleration sensor measures the acceleration. The diagnosing device outputs collision sensing information and diagnosis result information when the acceleration, which is greater than a preset collision determination threshold value, is sensed. The communication device outputs the diagnosis result information of the acceleration sensor.

The control unit includes a communication device and a failure diagnosing arrangement. The communication device receives the collision sensing information and the diagnosis result information, which are outputted from the acceleration sensing unit. The failure diagnosing arrangement includes an abnormality counter and a failure determining device. The abnormality counter is incremented based on the information received through the communication device. The failure determining device determines occurrence of a failure based on the counted number, which is counted by the abnormality counter.

In the above air bag system, the diagnosing device executes a test operation of the acceleration sensor. When an abnormality is found in the operation of the acceleration sensor, the diagnosing device outputs an abnormality code through the communication device. Then, when the failure diagnosing arrangement of the control unit receives the abnormality code through the communication device, the failure diagnosing arrangement increments the abnormality counter. Thereafter, when the number of the abnormality code counted with the abnormality counter reaches three, the failure diagnosing arrangement determines that the acceleration sensing unit has the failure. Therefore, the failure diagnosing arrangement flashes a warning light and stops the deployment control operation of the air bag on the acceleration sensing unit, which is determined to have the failure.

In the above system recited in Japanese Unexamined Patent Publication No. 2005-257304, the acceleration sensing unit outputs only the collision sensing information and the diagnosis result information besides the measured acceleration value. Thus, the control unit needs to determine the failure based on these outputs from acceleration sensing unit. In such a case, when the number of the acceleration sensing units installed in the vehicle 1 is increased, the load on the control unit is disadvantageously increased. Thus, the deployment operation of the control unit for deploying the air bag may possibly be disadvantageously affected.

Furthermore, in the acceleration sensing unit, the output value of the acceleration sensor may change with the temperature and with time. Thus, the offset correction for correcting the output value of the acceleration sensor by the amount of this change needs to be performed. However, in the above system, the acceleration sensing unit has no function for performing the offset correction on the acceleration sensing unit. Therefore, the offset correction of the output value of the acceleration sensing unit needs to be performed at the control unit. Therefore, the load on the control unit is also disadvantageously increased.

SUMMARY OF THE INVENTION

The present invention addresses the above disadvantages. Thus, it is an objective of the present invention to provide a control system that includes a plurality of sensor apparatuses and limits or alleviates a load on a control apparatus of the control system. It is another objective of the present invention to provide a sensor apparatus of such a control system, which limits or alleviates the load on the control apparatus of the control system. It is another objective of the present invention to provide an offset correction method of such a sensor apparatus.

To achieve the objectives of the present invention, there is provided a control system that includes a plurality of sensor apparatuses and a control apparatus. Each of the plurality of sensor apparatuses measures a corresponding physical quantity of a measurement subject and outputs a measurement value of the measured physical quantity. The control apparatus outputs an offset correction command to each of the plurality of sensor apparatuses to execute offset adjustment on an offset value of the measurement value in each required one of the plurality of sensor apparatuses, which requires the offset adjustment. Each sensor apparatus includes a sensing device, a communication device and an adjusting device. The sensing device generates a measurement signal, which changes in consistent with a change in the physical quantity of the measurement subject and indicates the measurement value of the measured physical quantity. The communication device performs two-way communication relative to the control apparatus and each remaining one of the plurality of sensor apparatuses. The communication device receives the offset correction command from the control apparatus, and the communication device outputs measurement information, which includes the measurement value indicated by the measurement signal generated from the sensing device of its own sensor apparatus, to each remaining one of the plurality of sensor apparatuses and receives the measurement information from each remaining one of the plurality of sensor apparatuses. The adjusting device adjusts the measurement value, which is indicated by the measurement signal received from the sensing device of its own sensor apparatus. The adjusting device determines a physical quantity application state of the sensing device of the own sensor apparatus based on the measurement value, which is indicated by the measurement signal received from the sensing device of the own sensor apparatus, in response to the offset correction command received from the control apparatus through the communication device of the own sensor apparatus. The adjusting device determines whether the physical quantity is applied to the sensing device of the own sensor apparatus based on the physical quantity application state of the sensing device of the own sensor apparatus, which is obtained based on the measurement value of the sensing device of the own sensor apparatus, and a physical quantity application state of the sensing device of each remaining one of the plurality of sensor apparatuses, which is obtained based on the measurement value included in the measurement information received from the remaining one of the plurality of sensor apparatuses through the communication device of the own sensor apparatus. The adjusting device executes the offset adjustment of the offset value of the measurement value, which is indicated by the measurement signal received from the sensing device of the own sensor apparatus, when the adjusting device determines that the physical quantity is not applied to any of the sensing devices of the plurality of sensor apparatuses.

To achieve the objectives of the present invention, there is also provided a sensor apparatus that serves as one of a plurality of sensor apparatuses of a control system to measure a corresponding physical quantity of a measurement subject and to output a measurement value of the measured physical quantity. A control apparatus of the control system outputs an offset correction command to each of the plurality of sensor apparatuses to execute offset adjustment on an offset value of the measurement value in each required one of the plurality of sensor apparatuses, which requires the offset adjustment. The sensor apparatus includes a sensing device, a communication device and an adjusting device. The sensing device generates a measurement signal, which changes in consistent with a change in the physical quantity of the measurement subject and indicates the measurement value of the measured physical quantity. The communication device performs two-way communication relative to the control apparatus and each remaining one of the plurality of sensor apparatuses. The communication device receives the offset correction command from the control apparatus, and the communication device outputs measurement information, which includes the measurement value indicated by the measurement signal generated from the sensing device of its own sensor apparatus, to each remaining one of the plurality of sensor apparatuses and receives the measurement information from each remaining one of the plurality of sensor apparatuses. The adjusting device adjusts the measurement value, which is indicated by the measurement signal received from the sensing device of its own sensor apparatus. The adjusting device determines a physical quantity application state of the sensing device of the own sensor apparatus based on the measurement value, which is indicated by the measurement signal received from the sensing device of the own sensor apparatus, in response to the offset correction command received from the control apparatus through the communication device of the own sensor apparatus. The adjusting device determines whether the physical quantity is applied to the sensing device of the own sensor apparatus based on the physical quantity application state of the sensing device of the own sensor apparatus, which is obtained based on the measurement value of the sensing device of the own sensor apparatus, and a physical quantity application state of the sensing device of each remaining one of the plurality of sensor apparatuses, which is obtained based on the measurement value included in the measurement information received from the remaining one of the plurality of sensor apparatuses through the communication device of the own sensor apparatus. The adjusting device executes the offset adjustment of the offset value of the measurement value, which is indicated by the measurement signal received from the sensing device of the own sensor apparatus, when the adjusting device determines that the physical quantity is not applied to any of the sensing devices of the plurality of sensor apparatuses.

To achieve the objectives of the present invention, there is further provided an offset correction method executed in one of a plurality of sensor apparatuses of a control system. According to the method, there is obtained an offset value of a measurement value, which is indicated by a measurement signal that is generated from a sensing device of the one of the plurality of sensor apparatuses of the control system upon measurement of a corresponding physical quantity of a measurement subject, when an offset correction command is received from a control apparatus of the control system through a communication device of the one of the plurality of sensor apparatuses. Then, it is determined whether the offset value of the measurement value of the one of the plurality of sensor apparatuses satisfies a physical quantity application state determination condition, which indicates that the physical quantity is not applied to the sensing device of the one of the plurality of sensor apparatuses. Then, there is obtained a result of the determining of whether the offset value of the measurement value of the one of the plurality of sensor apparatuses satisfies the physical quantity application state determination condition as a physical quantity application state of the one of the plurality of sensor apparatuses. Then, there is outputted the physical quantity application state of the one of the plurality of sensor apparatuses to each remaining one of the plurality of sensor apparatuses through the communication device of the one of the plurality of sensor apparatuses. Also, there is received the physical quantity application state of each remaining one of the plurality of sensor apparatuses through the communication device of the one of the plurality of sensor apparatuses. Next, it is determined whether the offset value of the measurement value of the one of the plurality of sensor apparatuses needs to be corrected based on the physical quantity application state of the one of the plurality of sensor apparatuses and the physical quantity application state of each remaining one of the plurality of sensor apparatuses. Then, the offset value of the measurement value of the one of the plurality of sensor apparatuses is adjusted in such a manner that the offset value of the measurement value, which is indicated by the measurement signal outputted from the sensing device of the one of the plurality of sensor apparatuses in a state where the physical quantity is not applied to the sensing device of the one of the plurality of sensor apparatuses, becomes substantially zero when it is determined that the offset value of the measurement value of the one of the plurality of sensor apparatuses needs to be corrected in the determining of whether the offset value of the measurement value of the one of the plurality of sensor apparatuses needs to be corrected.

BRIEF DESCRIPTION OF THE DRAWINGS

The invention, together with additional objectives, features and advantages thereof, will be best understood from the following description, the appended claims and the accompanying drawings in which:

FIG. 6 is a diagram, which indicates comparison of determination results of three sensors and offset adjustment required/non-required states of the three sensors.

DETAILED DESCRIPTION OF THE INVENTION

An embodiment of the present invention will be described with reference to the accompanying drawings. Sensor apparatuses and a control system having the same according to the embodiment are used in, for example, an air bag system of a vehicle. In the following description, the air bag system, which includes the acceleration sensors (serving as sensor apparatuses of the present invention) and a master ECU (serving as a control apparatus of the present invention), will be described.

Figure 1:
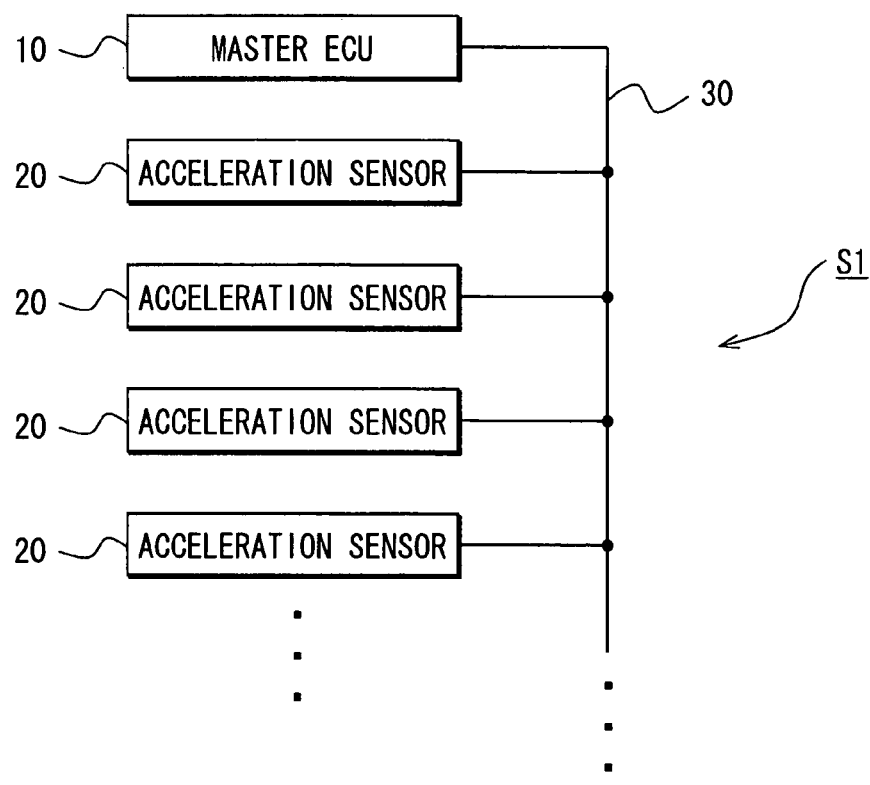
FIG. 1 is a block diagram of an air bag system according to an embodiment of the present invention.

FIG. 1 is a block diagram of the air bag system according to the embodiment of the present invention. As shown in FIG. 1, the air bag system S1 includes the master ECU 10 and the acceleration sensors 20. The master ECU 10 and the acceleration sensors 20 are interconnected through a connection line 30 to transmit signals therebetween.

Figure 2:
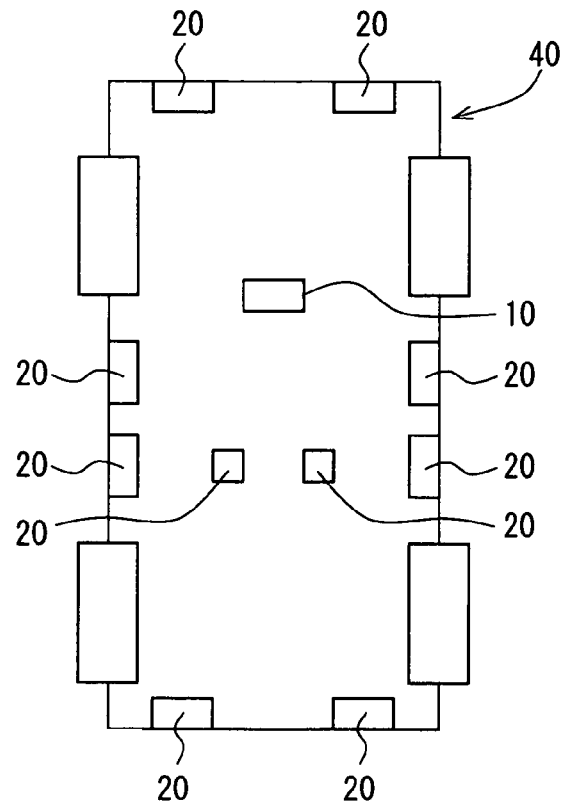
FIG. 2 is a diagram showing a master ECU and a plurality of acceleration sensors, which are depicted in FIG. 1 and are placed in a vehicle.

FIG. 2 is a diagram showing installation of the master ECU 10 and the acceleration sensors 20 in the vehicle. In the present embodiment, as shown in FIG. 2, ten acceleration sensors 20 are provided in the vehicle 40. More specifically, two acceleration sensors 20 are arranged in a center part of the vehicle 40, and two acceleration sensors 20 are arranged in a front part of the vehicle 40. Also, two acceleration sensors 20 are arranged in a rear part of the vehicle 40, and two acceleration sensors 20 are arranged in each lateral part of the vehicle. Air bags (not shown) are provided in a passenger compartment of the vehicle. When the vehicle 40 receives an impact at any one of the front part, the rear part and the lateral parts of the vehicle 40, the corresponding air bag(s) is deployed.

The master ECU 10 performs a deploying operation of the air bag based on an acceleration, which is measured with each acceleration sensor 20. In order to perform the deploying operation of the air bag, the master ECU 10 implements various functions, which include a function for outputting an offset correction command, a function for determining whether a collision of the vehicle 40 occurs based on an acceleration signal received from each acceleration sensor 20, a function for determining which air bag in the vehicle 40 needs to be deployed, and a function for outputting a deployment command for deploying the air bag to an air bag controller.

Specifically, the master ECU 10 outputs the offset correction command to each acceleration sensor 20 and has an offset correction command program for commanding each acceleration sensor 20 to perform an offset correction process. The master ECU 10 performs the deploying operation of the air bag based on each acceleration signal, which is obtained upon execution of the offset correction process that is executed according to the offset correction command program. The master ECU 10 is formed as a microcomputer and includes a communication device (not shown), which performs two-way communication with the acceleration sensors 20. The master ECU 10 corresponds to the control apparatus of the present invention.

Figure 3:
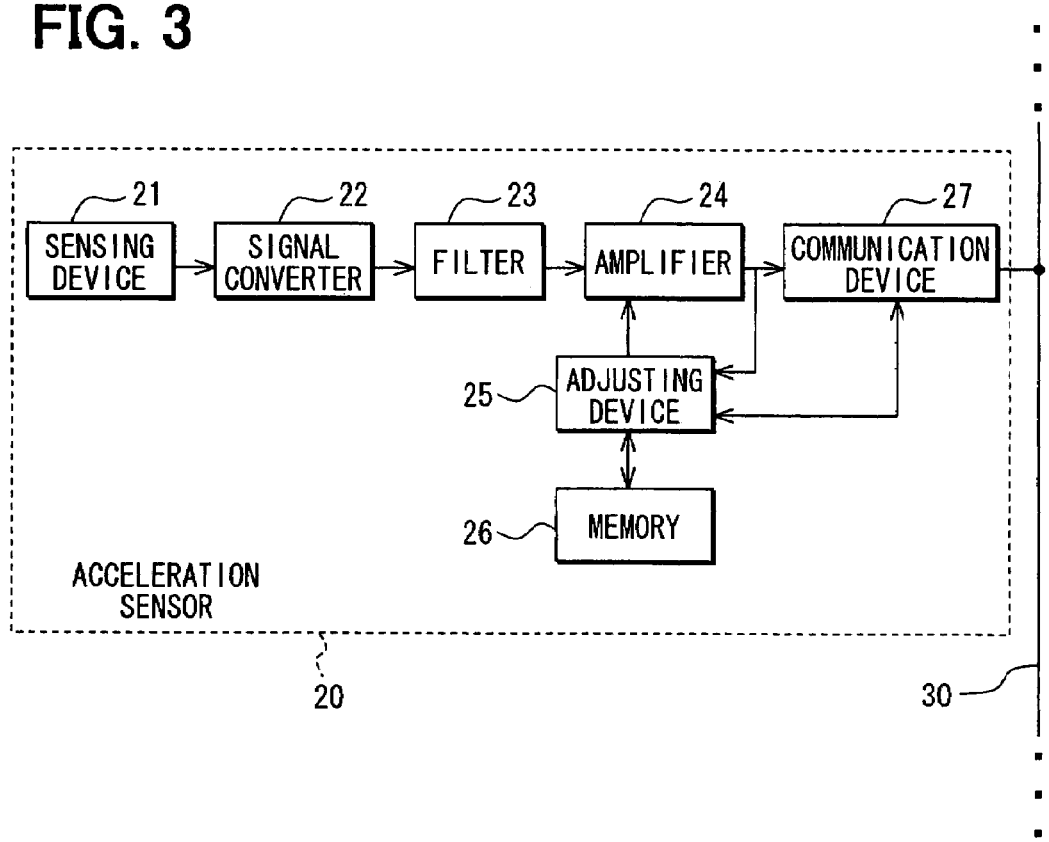
FIG. 3 is a diagram showing a specific structure of the acceleration sensor shown in FIG. 1 or FIG. 2.

FIG. 3 is a diagram showing a specific structure of the acceleration sensor 20. As shown in FIG. 3, the acceleration sensor 20 includes a sensing device 21, a signal converter 22, a filter 23, an amplifier 24, an adjusting device 25, a memory 26 and a communication device 27. The acceleration sensor 20 corresponds to the sensor apparatus of the present invention.

The sensing device 21 generates a measurement signal, which changes according to a change in a physical quantity (acceleration) of a measurement subject (vehicle 40). The sensing device 21 includes a beam structural body, which has a known comb teeth structure provided on, for example, a silicon substrate. In response to the applied acceleration, the sensing device 21 senses a change in a capacitance between a movable electrode and a stationary electrode. Then, an electrical signal (measurement signal), which corresponds to the change in the capacitance, is outputted from the sensing device 21 to the signal converter 22.

The signal converter 22 converts the electrical signal, which is received from the sensing device 21 and indicates the change in the capacitance, into a corresponding voltage signal. The filter 23 removes a noise from the voltage signal, which is received from the signal converter 22, and then outputs this filtered voltage signal to the amplifier 24.

The memory 26 is a storage medium, which stores adjustment values for adjusting the voltage signal at the amplifier 24. In the present embodiment, the adjustment values, which are stored in the memory 26, may include an offset value of the voltage signal in the absence of application of the acceleration on the acceleration sensor 20 (more specifically, the sensing device 21), a sensitivity adjustment value and an adjustment value(s) that corresponds to a surrounding temperature and an aging of the acceleration sensor 20.

The adjusting device 25 has various functions, which include a function for retrieving the adjustment value(s) from the memory 26 and for outputting the retrieved adjustment value(s) to the amplifier 24, an acceleration application state sensing function for obtaining a measured acceleration in the absence of application of the acceleration to the acceleration sensor 20 in response to an offset correction command received from the master ECU 10, an offset adjusting function for performing an offset correction on the measured acceleration in the absence of application of the acceleration to its acceleration sensor 20 based on the acceleration application state of its acceleration sensor 20 and the acceleration application states of the other acceleration sensors 20, and a function for appending an identification label in the voltage signal, which is outputted from the adjusting device 25, to identify the outputted voltage signal as its own voltage signal.

The amplifier 24 amplifies and adjusts the voltage signal, which is received from the filter 23, based on the adjustment value(s) received from the adjusting device 25 to generate an acceleration signal, which is in turn outputted from the amplifier 24 to the communication device 27. Furthermore, the communication device 27 performs two-way communication with the master ECU 10 and the other acceleration sensors 20. The communication device 27 has an A/D converting function for performing analog-to-digital conversion of the voltage signal received from the amplifier 24 and a communicating function for performing the two-way communication with master ECU 10 and the other acceleration sensors 20 through the connection line 30. That is, the communication device 27 externally outputs the measurement information, which includes a measurement value indicated by a measurement signal at the acceleration sensor 20 upon sensing of the acceleration.

The acceleration sensor 20 includes, for example, a microcomputer and has an offset adjustment program for determining the acceleration application state thereof in response to the offset correction command and for performing an offset correction through comparison of the determined acceleration application state thereof with the acceleration application states of the other acceleration sensors 20. This offset adjustment program is executed by the adjusting device 25.

The respective acceleration sensors 20 have the identical structure and sense an acceleration component in one corresponding axial direction. The acceleration sensors 20 are arranged in corresponding locations of the vehicle 40 to sense the acceleration component in the corresponding axial direction. For example, the axial direction may be a traveling direction of the vehicle 40, a perpendicular direction, which is perpendicular to the traveling direction of the vehicle 40, or a vertical direction (a direction of a plumb line). In the above section, the entire structure of the air bag system S1 of the present embodiment is described.

In the air bag system S1, the acceleration signal is supplied from each acceleration sensor 20 to the master ECU 10. Then, the master ECU 10 determines whether the value of the acceleration indicated by the acceleration signal of each acceleration sensor 20 exceeds a predetermined threshold value, which indicates occurrence of a collision of the vehicle 40. At this time, it is determined which one or more of the air bags in the vehicle 40 needs to be deployed based on the corresponding direction of the acceleration, the value of which has exceeded the predetermined threshold value. Thereafter, the deployment command for deploying the corresponding air bag is outputted from the master ECU 10 to the air bag controller (not shown), so that the corresponding air bag is deployed.

Figure 4:
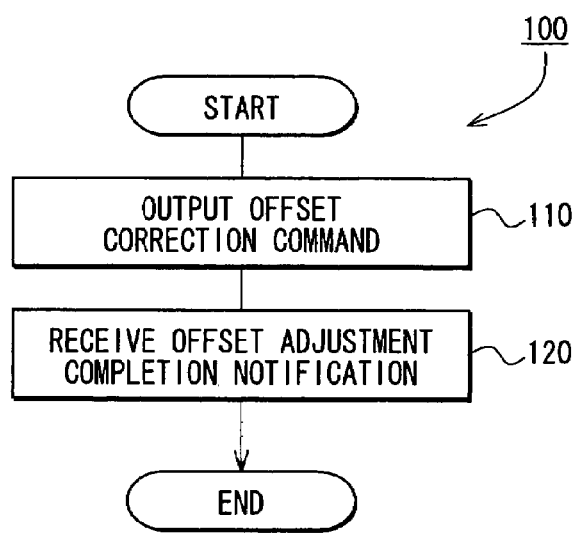
FIG. 4 is a flowchart, which indicates details of an offset correction command program according to the embodiment.

Next, the offset adjustment, which is performed among the acceleration sensors 20 will be described. First, the operation of the master ECU 10 will be described with reference to FIG. 4. FIG. 4 is a flowchart, which indicates details of the offset correction command program. According to the present embodiment, the flow of the flowchart starts according to the offset correction command program 100 when the vehicle speed of the vehicle 40 is zero (i.e., the acceleration is zero), that is, when the vehicle 40 is stopped (i.e., in a non-moving period of the vehicle 40). Therefore, the master ECU 10 receives a signal, which corresponds to a current vehicle speed, from a vehicle speed sensor (not shown), and the master ECU 10 starts the flow shown in FIG. 4 based on a value of the vehicle speed.

At step 110, the offset correction command is outputted. Specifically, the offset correction command is outputted from the master ECU 10 to the respective acceleration sensors 20 through the connection line 30. In this way, the offset adjustment is performed in the respective acceleration sensors 20. This will be described latter in detail.

At step 120, the master ECU 10 receives an offset adjustment completion notification, which indicates completion of the offset adjustment, from the respective acceleration sensors 20. Specifically, a result of the offset adjustment, which is performed in each acceleration sensor 20 upon receiving the offset correction command at step 110, is supplied from each acceleration sensor 20 to the master ECU 10. The result of the offset adjustment may be, for example, a non-adjustable state, an adjustment completion state, an adjustment failure state, or an adjustment non-required state, and such a result of the adjustment is supplied from each acceleration sensor 20 to the master ECU 10. Then, the current flowchart is terminated.

When the master ECU 10 receives the offset adjustment completion notification, the master ECU 10 performs, for example, a failure determination process for determining a failure of the acceleration sensor 20, a diagnosis result outputting process for outputting a diagnosis result and/or an offset correction readjustment commanding operation.

Figure 5:
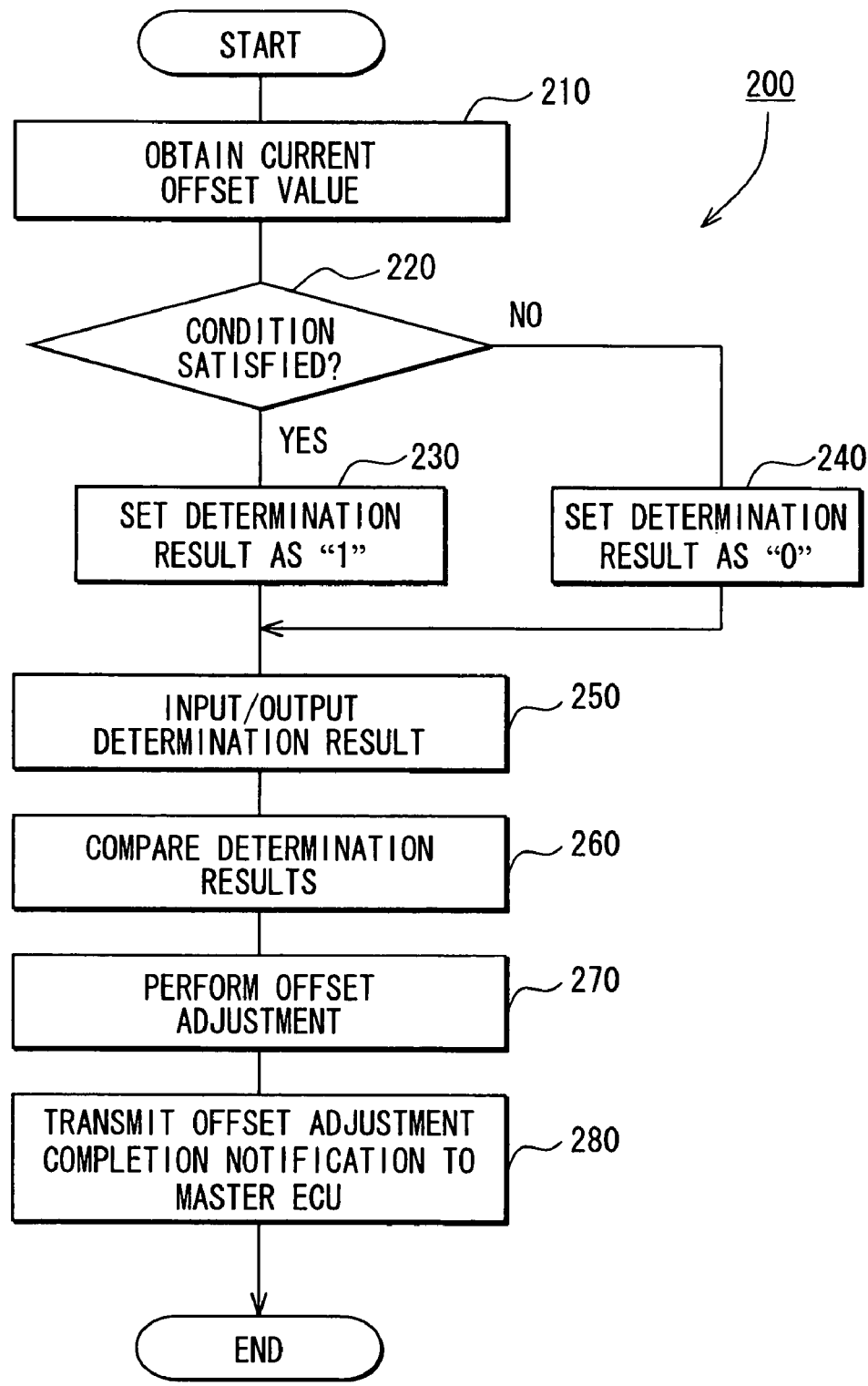
FIG. 5 is a flowchart, which indicates details of an offset adjustment program according to the embodiment.

Now, the operation of each acceleration sensor 20 will be described. FIG. 5 is a flowchart, which indicates details of the offset adjustment program. In the present embodiment, when the acceleration sensor 20 receives the offset correction command from the master ECU 10, the flow indicated in FIG. 5 is started according to the offset adjustment program 200 in the acceleration sensor 20. When the acceleration sensor 20 receives the offset correction command from the master ECU 10, the signal, which indicates this offset correction command, is supplied to the adjusting device 25 through the connection line 30 and the communication device 27.

At step 210 (serving as an offset value obtaining means), the current offset value is obtained. Specifically, the electrical signal, which indicates the change in the capacitance measured with the sensing device 21, is converted into the corresponding voltage signal at the signal converter 22, and the noise is removed from the voltage signal through the filter 23. Thereafter, the voltage signal is amplified and is adjusted at the amplifier 24, and this voltage signal is supplied to the communication device 27 as the acceleration signal. At this time, the acceleration signal, which is outputted from the amplifier 24, is feed-backed to the adjusting device 25. Then, the value of the acceleration, which is indicated by the supplied acceleration signal, is obtained as the offset value.

At step 220, the acceleration application state is determined. Specifically, it is determined whether the offset value, which is obtained at step 210, is in an attainable (or negligible) offset value range in the current state of the vehicle 40 and is lower than a predetermined threshold value, below which it is determined that the acceleration is not applied to the vehicle 40. In the present embodiment, this condition is referred to as an acceleration application state determination condition (or a physical quantity application state determination condition). Thus, at step 220, it is determined whether the acceleration application state determination condition is satisfied.

Here, it should be noted that the value of the acceleration may not completely become zero even in the stopped state of the vehicle 40 and may vary with time. Thus, according to the present embodiment, the condition for determining that the acceleration is zero is satisfied includes the condition where the offset value is in an offset value range, within which the acceleration is considered as zero, i.e., the condition where the offset value is in the attainable offset value range. Furthermore, according to the present embodiment, the condition for determining that the acceleration is zero includes the condition where the acceleration of the vehicle 40 is lower than the predetermined threshold value, below which it is determined that the acceleration is not applied to the vehicle 40.

When the above condition is satisfied at step 220, it is determined that the acceleration, which is applied to the acceleration sensor 20, is zero, and the operation proceeds to step 230. In contrast, when the above condition is not satisfied at step 220, it is determined that the acceleration is applied to the acceleration sensor 20, and the operation proceeds to step 240.

At step 230, it is determined that the acceleration, which is applied to the acceleration sensor 20, is zero, and a result of the determination is set to "1". At step 240, it is determined that the acceleration is applied to the acceleration sensor 20, and a result of the determination is set to "0". The above steps 220 to 240 correspond to a condition determining means of the present invention.

Then, at step 250 (a determination result outputting and receiving means), the result of the determination is outputted. Specifically, a determination result signal, which indicates a sensor identification number, an acceleration sensing direction and the determination result, is generated by the adjusting device 25, and this determination result signal is outputted as the measurement information from the adjusting device 25 to the connection line 30 through the communication device 27. Furthermore, the determination result signal, which is obtained in each of the rest of the acceleration sensors 20, is supplied to the adjusting device 25 through the connection line 30 and the communication device 27. Thus, in the present instance where the ten acceleration sensors 20 are provided in the vehicle 40, the determination results of all of the ten acceleration sensors 20 are provided in each acceleration sensor 20.

At step 260 (serving as a determination result comparing means), the determination results are compared. This comparison is made for a group of common acceleration sensors 20, which have the common acceleration sensing direction. In the following illustrative description, comparison of three exemplary acceleration sensors A, B, C, each of which represents the corresponding acceleration sensor 20, will be described with reference to FIG. 6. FIG. 6 is a diagram, which indicates the comparison of the determination results of the three sensors A to C and the offset adjustment required/non-required states (offset adjustment executing/non-executing states) of the three sensors A to C.

As shown in FIG. 6, in the case of the three sensors A to C, there are four possible cases CASE-A to CASE-D with respect to the determination result of the acceleration application state of the acceleration sensors. In the case of CASE-A, it is determined that the acceleration is applied to all of the sensors A to C. In the case of CASE-B, it is determined that the acceleration is applied to the sensor A and the sensor B while the acceleration is zero at the sensor C. In the case of CASE-C, it is determined that the acceleration is applied to the sensor A while the acceleration is zero at the sensor B and the sensor C. Furthermore, in the case of CASE-D, the acceleration of each of the sensors A to C is determined as zero.

Among the above described cases, in the case of CASE-A, the determination results indicate that the acceleration is applied to all of the sensors A to C, so that the overall determination result indicates that it is the acceleration applied state where the acceleration is applied to the acceleration sensor 20. Thus, it is not required to perform the offset adjustment on all of the sensors A to C, and thereby the offset adjustment required/non-required state is set to "0" for each of the sensors A to C to indicate the offset adjustment will not be performed.

In the case of CASE-B, only the determination result of the sensor C indicates that the acceleration is zero (0), and the determinations of the sensors A and B indicate that the acceleration is applied to the sensors A and B. Thus, the overall determination indicates that it is the acceleration applied state. Since this is the state where the acceleration is applied, the offset adjustment is not required. Therefore, the offset adjustment required/non-required state is set to "0" for each of the sensors A to C.

In contrast, in the case of CASE-C, only the determination result of the acceleration sensor A indicates that the acceleration is applied to the sensor A, and the determination results of the acceleration sensors B and C indicate that the acceleration is zero (0). Thus, the overall determination indicates that the acceleration is zero (0). Thus, the offset adjustment required/non-required state is set to "1" for each of the sensors A to C to indicate that the offset adjustment will be executed in such a manner that the value of the measured acceleration approximates to zero (0) in each of the sensors A to C.

Furthermore, in the case of CASE-D, the determination results of all of the sensors A to C indicate that the acceleration is zero (0). Thus, the overall determination indicates that the acceleration is zero (0). Therefore, similar to the case of CASE-C, the offset adjustment required/non-required state of each of the sensors A to C is set to "1".

Although the diagram of FIG. 6 indicates only the four patterns, the determination result of the sensor A or the sensor B among the sensors A to C may possibly become "1" in the case of CASE-B. Furthermore, the determination result of the sensor B or sensor C among the sensors A to C may possible become "0" in the case of CASE-C.

Returning to FIG. 5, at step 270 (serving as an offset adjusting means), the offset adjustment is performed. Specifically, at step 260, the offset adjustment is performed in such a manner that the value of the acceleration approximates to zero (0) in the case of CASE-C and the case of CASE-D where the offset adjustment required/non-required state of each sensor is set to "1" to request the execution of the offset adjustment. In the present embodiment, the offset adjustment is performed through multiple approximating steps to approximate the value of the acceleration to zero (i.e., substantially zero) in a stepwise manner.

Specifically, the acceleration signal, which is outputted from the amplifier 24, is feed-backed to the adjusting device 25, so that an adjustment value, which needs to be adjusted in the offset adjustment, is set and is supplied to the amplifier 24, and thereby the acceleration signal undergoes the offset adjustment through this feedback loop. When this feedback process is repeated, the offset adjustment is performed such that the value of the acceleration becomes zero (0).

At step 260, in the case where the offset adjustment required/non-required state of each sensor is set to "0", which indicates that the offset adjustment will not be performed, the offset adjustment is not performed, and the operation proceeds to step 280.

In the sensor A in the case of CASE-C, it is determined that the acceleration is applied, so that the offset value of the sensor A may possibly become a relatively large value in comparison to that of the sensor B and that of the sensor C in the case of CASE-C. In such a case, the number of approximating steps may be increased in the offset adjustment of the sensor A in comparison to that of the sensor B or that of the sensor C, or alternatively, the offset value of the sensor A may be directly adjusted to zero (0) although possibly resulting in a reduced accuracy.

At step 280 (serving as a notifying means), an offset adjustment completion notification is transmitted to the master ECU 10. Specifically, the offset adjustment completion notification, which indicates the non-adjustable state (e.g., in the case of CASE-A), the adjustment completion state (e.g., in the case of CASE-B or CASE-C), the adjustment failure state (e.g., in the case of CASE-B or CASE-C), or the adjustment non-required state (e.g., in the case of CASE-D), is outputted from each acceleration sensor 20 to the master ECU 10.

The offset adjustment completion notification, which is outputted at step 280, is obtained by the master ECU 10 at step 120 of FIG. 4, which is described above. Then, the current flowchart is terminated.

Thereafter, the master ECU 10 diagnoses, for example, a failure of each acceleration sensor 20 based on the offset adjustment result, which is supplied from each acceleration sensor 20. As described above, in the state where the vehicle speed is zero (0), the offset correction command is outputted from the master ECU 10 to each acceleration sensor 20. Thus, each acceleration sensor 20 should provide the result, which indicates the execution of the offset adjustment, to the master ECU 10 as long as the acceleration sensor 20 does not have a failure. However, when the result, which indicates that the offset adjustment will not be performed, is received from any one of the acceleration sensors 20, this acceleration sensor 20 may possibly have a failure. In such a case, the offset correction command is outputted from the master ECU 10 to this acceleration sensor 20 once again to more accurately determine whether this acceleration sensor 20 has the failure.

After the execution of the offset adjustment in the above described manner, the acceleration is sensed with each corresponding acceleration sensor 20, and this is notified to the master ECU 10.

As described above, in the present embodiment, the offset correction command is outputted from the master ECU 10 to each acceleration sensor 20, so that the offset adjustment is performed among the acceleration sensors 20 by sharing the acceleration signals among the acceleration sensors 20. That is, the master ECU 10 does not perform the offset correction of the measurement value (the value of the acceleration), which is obtained by each acceleration sensor 20. Rather, each acceleration sensor 20, which receives the offset correction command, performs the offset adjustment of its own measurement value. In this way, the load of the master ECU 10, which is associated with the respective acceleration sensors 20, can be reduced.

Furthermore, the offset adjustment is carried out among the acceleration sensors 20, which receive the offset correction command and have the common sensing direction, so that the accuracy of the measurement value in the one direction can be improved. Thus, the highly accurate collision determination and the air bag control operation can be performed in the master ECU 10 through use of the measurement values, which are obtained at the respective acceleration sensors 20.

Furthermore, the master ECU 10 does not need to perform the offset correction upon identifying the respective acceleration sensors 20. Thus, the master ECU 10 only needs to store the information about the connected acceleration sensors 20, which are connected to the master ECU 10. That is, in the above air bag system S1, addition or elimination of the acceleration sensor(s) 20 can be easily performed, and therefore the management of the acceleration sensors 20 is eased.

The present invention is not limited to the above embodiment, and the above embodiment may be modified in various ways without departing from the spirit and scope of the invention, as described below.

In the above embodiment, the master ECU 10 executes the offset correction command program 100, which causes the outputting of the offset correction command from the master ECU 10, in the non-moving period of the vehicle 40. However, the timing for executing the offset correction command program 100 is not limited to the non-moving period of the vehicle 40. In other words, the offset correction command program 100 may be executed in a moving period of the vehicle 40.

In the above embodiment, the acceleration sensors 20 are described as sensor apparatuses of the present invention. However, the sensor apparatuses of the present invention, which sense the physical quantity, are not limited to the acceleration sensors 20 and may be any other suitable sensors, such as temperature sensors, pressure sensors or gyro-sensors. Furthermore, all the sensor apparatuses used in the system do not need to measure the same physical quantity. For example, any appropriate combination of the acceleration sensor(s), the pressure sensor(s) and/or the gyro-sensor(s) may be used to implement the sensor apparatuses of the present invention.

Also, in the case where the acceleration sensors 20 are provided as the sensor apparatuses of the present invention, all the acceleration sensors 20 do not need to measure the acceleration component in the same direction. As described above, the acceleration sensors 20, which measure the acceleration component in different directions, respectively, may be used.

Furthermore, at the time of transmitting the output (the output value at the time of implementing the pseudo acceleration applied state) from each acceleration sensor 20 through the communication device 27 during the self-diagnosis of the acceleration sensor 20, the adjusting device 25 may perform a self-diagnostic output value correction operation for correcting its output value in a manner similar to that of the above embodiment.

Also, in order to limit occurrence of erroneous determination, which is caused by an erroneous operation of the acceleration sensor 20, each acceleration sensor 20 is paired with another acceleration sensor 20 to implement the acceleration sensor 20 for making a main determination and the acceleration sensor 20 for making a supplementary determination. When the two acceleration sensors 20 are paired, the timing for performing the offset adjustment may be changed between the acceleration sensor 20 for making the main determination and the acceleration sensor 20 for making the supplementary determination. In this way, it is possible to limit the erroneous determination of the vehicle collision in the master ECU 10. The timing for performing the offset adjustment may be preset in the respective acceleration sensors 20.

Finally, it should be understood that the steps shown in the drawings correspond to the corresponding respective means, which implements the corresponding operation.

Additional advantages and modifications will readily occur to those skilled in the art. The invention in its broader terms is therefore not limited to the specific details, representative apparatus, and illustrative examples shown and described.

What is claimed is:

1. A control system comprising:
    a plurality of sensor apparatuses, each of which measures a corresponding physical quantity of a measurement subject and outputs a measurement value of the measured physical quantity; and
    a control apparatus that outputs an offset correction command to each of the plurality of sensor apparatuses to execute offset adjustment on an offset value of the measurement value in each required one of the plurality of sensor apparatuses, which requires the offset adjustment, wherein each sensor apparatus includes:
        a sensing device that generates a measurement signal, which changes in consistent with a change in the physical quantity of the measurement subject and indicates the measurement value of the measured physical quantity;
        a communication device that performs two-way communication relative to the control apparatus and each remaining one of the plurality of sensor apparatuses, wherein the communication device receives the offset correction command from the control apparatus, and the communication device outputs measurement information, which includes the measurement value indicated by the measurement signal generated from the sensing device of its own sensor apparatus, to each remaining one of the plurality of sensor apparatuses and receives the measurement information from each remaining one of the plurality of sensor apparatuses; and an adjusting device that adjusts the measurement value, which is indicated by the measurement signal received from the sensing device of its own sensor apparatus, wherein:

the adjusting device determines a physical quantity application state of the sensing device of the own sensor apparatus based on the measurement value, which is indicated by the measurement signal received from the sensing device of the own sensor apparatus, in response to the offset correction command received from the control apparatus through the communication device of the own sensor apparatus;

the adjusting device determines whether the physical quantity is applied to the sensing device of the own sensor apparatus based on the physical quantity application state of the sensing device of the own sensor apparatus, which is obtained based on the measurement value of the sensing device of the own sensor apparatus, and a physical quantity application state of the sensing device of each remaining one of the plurality of sensor apparatuses, which is obtained based on the measurement value included in the measurement information received from the remaining one of the plurality of sensor apparatuses through the communication device of the own sensor apparatus; and the adjusting device executes the offset adjustment of the offset value of the measurement value, which is indicated by the measurement signal received from the sensing device of the own sensor apparatus, when the adjusting device determines that the physical quantity is not applied to any of the sensing devices of the plurality of sensor apparatuses.

2. The control system according to claim 1, wherein the adjusting device of each sensor apparatus includes:

an offset value obtaining means for obtaining the offset value of the measurement value, which is indicated by the measurement signal generated from the sensing device of the own sensor apparatus, when the offset value obtaining means receives the offset correction command from the control apparatus through the communication device of the own sensor apparatus;

a condition determining means for making a determination of whether the offset value of the measurement value obtained by the offset value obtaining means of the own sensor apparatus satisfies a physical quantity application state determination condition, which indicates the physical quantity is not applied to the sensing device of the own sensor apparatus, and for obtaining a result of the determination as a physical quantity application state;

a determination result outputting and receiving means for outputting the physical quantity application state, which is obtained by the condition determining means of the own sensor apparatus, to each remaining one of the plurality of sensor apparatuses through the communication device of the own sensor apparatus and also for receiving through the communication device of the own sensor apparatus the physical quantity application state of each remaining one of the plurality of sensor apparatuses, which is obtained by the condition determining means of the adjusting device of the remaining one of the plurality of sensor apparatuses;

a determination result comparing means for determining whether the offset value of the measurement value of the own sensor apparatus needs to be corrected based on the physical quantity application state of the own sensor apparatus and the physical quantity application state of each remaining one of the plurality of sensor apparatuses; and an offset adjusting means for adjusting the offset value of the measurement value of the own sensor apparatus in such a manner that the offset value of the measurement value, which is indicated by the measurement signal outputted from the sensing device of the own sensor apparatus in a state where the physical quantity is not applied to the sensing device of the own sensor apparatus, becomes substantially zero when the determination result comparing means determines that the offset value of the measurement value of the own sensor apparatus needs to be corrected.

3. The control system according to claim 2, wherein the determination result comparing means determines whether the offset value of the measurement value of the own sensor apparatus needs to be corrected based on the physical quantity application states of the plurality of sensor apparatuses, each of which has a common measurement direction of the sensing device thereof for measuring the physical quantity.

4. The control system according to claim 1, wherein the adjusting device of each sensor apparatus includes a notifying means for notifying completion of the offset adjustment on the offset value of the measurement value of the own sensor apparatus to the control apparatus after completion of the offset adjustment.

5. The control system according to claim 1, wherein each of the plurality of sensor apparatuses is paired with another one of the plurality of sensor apparatuses such that a first one of the two sensor apparatuses of each pair is for making a main determination, and a second one of the two sensors of each pair is for making a supplementary determination, and the first one and the second one of the two sensor apparatuses of each pair execute the offset adjustment at different time points, respectively.

6. A sensor apparatus that serves as one of a plurality of sensor apparatuses of a control system to measure a corresponding physical quantity of a measurement subject and to output a measurement value of the measured physical quantity, wherein a control apparatus of the control system outputs an offset correction command to each of the plurality of sensor apparatuses to execute offset adjustment on an offset value of the measurement value in each required one of the plurality of the sensor apparatuses, which requires the offset adjustment, the sensor apparatus comprising:

a sensing device that generates a measurement signal, which changes in consistent with a change in the physical quantity of the measurement subject and indicates the measurement value of the measured physical quantity;

a communication device that performs two-way communication relative to the control apparatus and each remaining one of the plurality of sensor apparatuses, wherein the communication device receives the offset correction command from the control apparatus, and the communication device outputs measurement information, which includes the measurement value indicated by the measurement signal generated from the sensing device of its own sensor apparatus, to each remaining one of the plurality of sensor apparatuses and receives the measurement information from each remaining one of the plurality of sensor apparatuses; and an adjusting device that adjusts the measurement value, which is indicated by the measurement signal received from the sensing device of its own sensor apparatus, wherein:

the adjusting device determines a physical quantity application state of the sensing device of the own sensor apparatus based on the measurement value, which is indicated by the measurement signal received from the sensing device of the own sensor apparatus, in response to the offset correction command received from the control apparatus through the communication device of the own sensor apparatus;

the adjusting device determines whether the physical quantity is applied to the sensing device of the own sensor apparatus based on the physical quantity application state of the sensing device of the own sensor apparatus, which is obtained based on the measurement value of the sensing device of the own sensor apparatus, and a physical quantity application state of the sensing device of each remaining one of the plurality of sensor apparatuses, which is obtained based on the measurement value included in the measurement information received from the remaining one of the plurality of sensor apparatuses through the communication device of the own sensor apparatus; and the adjusting device executes the offset adjustment of the offset value of the measurement value, which is indicated by the measurement signal received from the sensing device of the own sensor apparatus, when the adjusting device determines that the physical quantity is not applied to any of the sensing devices of the plurality of sensor apparatuses.

7. The sensor apparatus according to claim 6, wherein the adjusting device adjusts a self-diagnosis output value, which is outputted from the communication device of the own sensor apparatus to each remaining one of the plurality of sensors.

* * * * *